May 16, 1933.    C. H. LITTLE    1,909,290
DRAFTING MACHINE
Filed Sept. 1, 1928
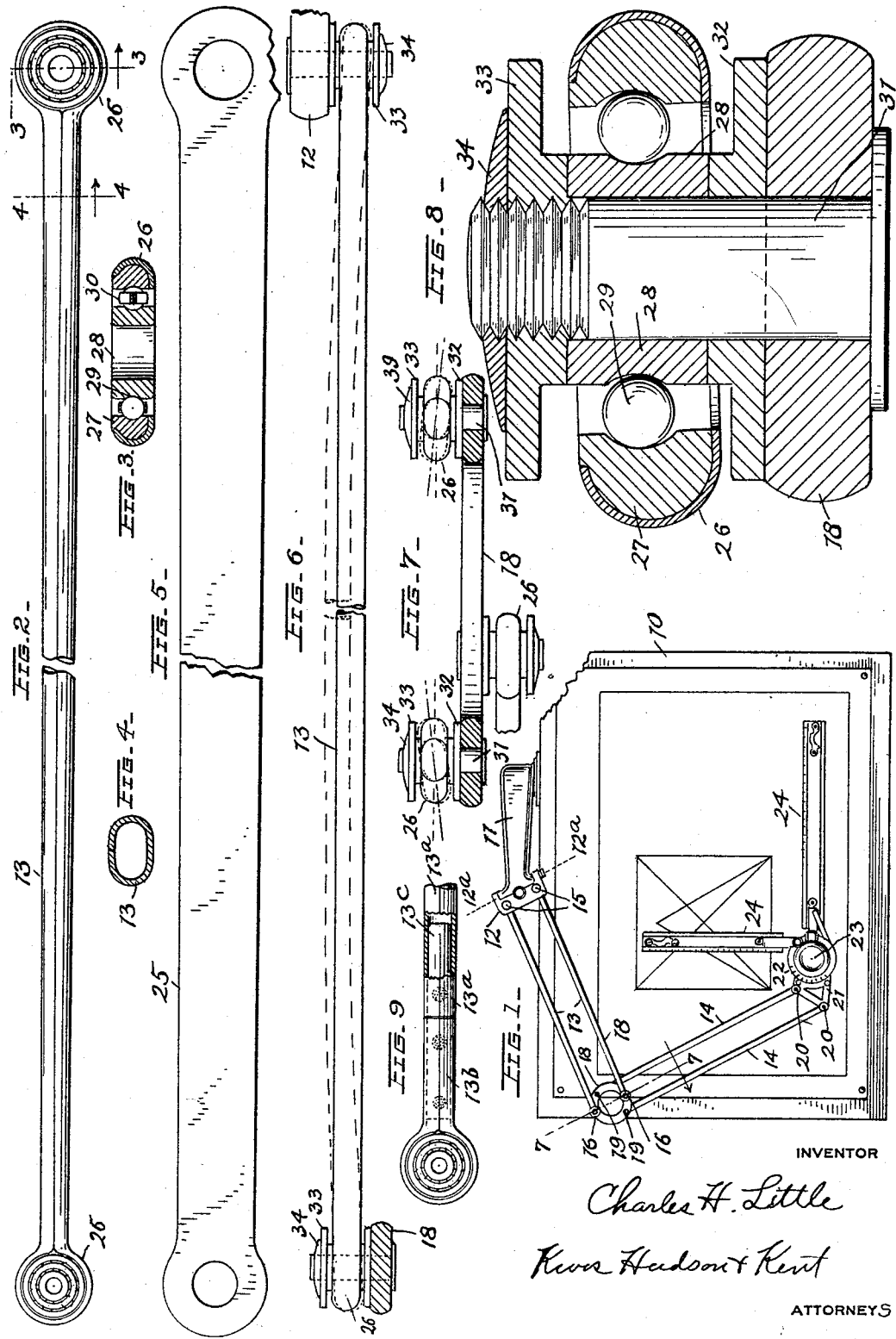
INVENTOR
Charles H. Little
Kwos Hudson & Kent
ATTORNEYS Patented May 16, 1933

1,909,290

UNITED STATES PATENT OFFICE

CHARLES H. LITTLE, OF CLEVELAND HEIGHTS, OHIO

DRAFTING MACHINE

Application filed September 1, 1928. Serial No. 303,391.

This invention relates to drafting machines of the jointed arm type, and though not necessarily confined thereto has a special reference to drafting machines of the well known Universal type such as illustrated in numerous prior patents granted to me.

More particularly the invention relates to the bearings or connections between the parts of the jointed arm, a ball bearing type of joint being here contemplated, and in certain respects this invention is an improvement on the ball bearing joint forming a part of the invention covered by my Patent No. 1,208,340, granted December 12th, 1916.

As is well known in a machine of the Universal type the jointed arm includes two connected parallelograms, one being connected to an anchor plate designed to be attached or supported on a drawing board and the other carrying a protractor to which rulers may be applied.

In a machine of this kind accuracy demands that loose play at the joints be entirely eliminated and that the joints be so formed that the parts are freely relatively movable. Likewise, it is important that the parts have the lightest possible weight consistent with necessary stiffness, dependability and durability.

The necessity of freedom of movement without loose play in the joints will be more fully appreciated when it is considered that even though the backlash or lost motion in each joint is exceedingly small the result is a very serious play at the drafting tools, since the play is increased by the number of joints and the sum total is greatly magnified by the leverages through which the movement is transmitted. A play of only .0005 inch in each joint produces about $\frac{1}{10}$ inch play at the end of an 18 inch scale.

A type of joint which has permitted freedom of movement and eliminated loose play is disclosed in my prior patent referred to above, this patent disclosing a joint or connection of the ball bearing type with the balls clamped between two conical races, elimination of loose play being obtained in each joint by screwing one of the races down until the play is eliminated. While this form of ball bearing joint is effective in most respects and has been used very extensively in drafting machines of my manufacture, nevertheless, in other respects, it is not wholly satisfactory. For example, to tighten a joint so as to clamp the balls against loose play the cones are moved relatively by screw action on the threaded post extending centrally through the joint and, naturally, skill is involved in making the necessary adjustment, it being, of course, possible that the joint may be left too loose or too tight. Then, again, as one raceway is screwed down there exists a possibility that due to imperfections in the threads one raceway may not be exactly concentric with the other. This lack of concentricity of the raceways throws out the center of rotation, makes the action of the parallelogram inaccurate and renders it necessary that the machine be tested out to find both the amount and direction of the error and when these points have been determined various other adjustments must be made to compensate for the error. This entails considerable expense and makes difficult interchangeability of parts, inasmuch as all parts of the machine have been adjusted to compensate for the relative eccentricity of the raceways to prevent any inaccuracy showing at the protractor end of the machine because of it. Furthermore, the joint is not fool proof; a drafting machine user not skilled in mechanical matters may tamper with the adjustment and thus disturb its accuracy.

Furthermore, the cone type bearing illustrated in my patent is a bearing of the four-point type and the rolling surfaces, in so far as the balls are concerned, are not at the maximum diameter of the balls, which is not the case with bearings of the annular or two-point type.

I overcome the above mentioned disadvantages and at the same time retain all the advantages of the type of ball bearing joint illustrated in my prior patent by employing a two-point bearing of the annular type with automatic means for clamping the parts and eliminating lost motion or play between the raceways, this being preferably obtained by automatic spring action in the rods composing the parallelograms (assuming that the machine is of the double parallelogram type) and becoming effective automatically on the assembly of the parts or in connecting together the jointed members.

The invention may be here briefly summarized as consisting in certain novel combinations and arrangements of parts and details of construction which will be described in the specification and set forth in the appended claims.

In the accompanying sheet of drawing illustrating my improved bearings, Fig. 1 is a plan view of a drafting machine of the Universal type, applied to a drafting board; Fig. 2 is a plan view of one of the rods equipped at its ends with my improved bearings, four such rods being employed in forming the two parallelograms; Fig. 3 is a slightly enlarged cross-sectional view through the bearing at one end of the rod, the section being taken substantially along the line 3—3 of Fig. 2; Fig. 4 is a section substantially along the line 4—4 of Fig. 2, showing that the rods may be of tubular form and may be made from sheet metal; Fig. 5 is a plan view of a stamping such as may be employed in forming a rod shown in Fig. 2; Fig. 6 is a side view of the rod connected at its ends by my improved bearings to cross members of the parallelogram, this view illustrating by dotted lines to a considerably exaggerated degree a bend which may be imparted to the rod to bring about the elimination of lost motion in the bearing by the spring action of the rod; Fig. 7 is a sectional view substantially along the line 7—7 of Fig. 1, showing by dotted lines and again to an exaggerated degree how the spring action of the rods may, in a somewhat different manner than by the means used in Fig. 6, eliminate lost motion in the bearing, this view illustrating the accomplishment of the result by imparting a slight twist to the rod; Fig. 8 is an enlarged sectional view through a joint typical of those at the ends of all the different rods of the two parallelograms, this view illustrating, greatly magnified, how the outer race is tilted relative to the inner race to eliminate lost motion in the bearing by the initial slight distortion imparted to the rods in a manner such as indicated in Fig. 6 or Fig. 7 or otherwise; and Fig. 9 is a view illustrating a slight modification in the manner of forming the rods.

In Fig. 1, I have shown applied to the drawing board 10 a Universal drafting machine. It is secured to the board by means of an anchor 11 here shown as a mid-anchor, but of course any suitable anchor may be employed, which may be applied to the corner of the board. As is customary in machines of this type, the anchor 11 has an anchor plate 12 pivoted thereto, the plate 12 being in this instance pivoted to the anchor to swing about an axis indicated by the line 12a. The upper parallelogram includes the two parallel rods 13 and the lower parallelogram includes the two parallel rods 14. These rods may be either tubular or solid, but are preferably tubular, as will be explained presently. The upper ends of the rods 13 are pivotally connected at 15 to the plate 12 by my improved ball bearing joints and their lower ends are similarly connected at 16 to a cross-member here shown in the form of an annulus 18. The rods 14 have two of their ends connected at 19 to the annulus and their other ends pivotally connected at 20 to a protractor plate 21 provided with a protractor 22 rotatable about the center 23 and carrying chucks at right angles to each other and adapted to be provided with scales or straight edges 24. The joints or pivotal connections at 19 and 20 are like the joints 15 and 16 formed by my improved ball bearings.

As stated above, the arms may be solid but are preferably tubular, and, if so, are generally oval-shaped in cross section, as indicated in Fig. 4. If tubular, the arms including the eyes which receive the bearings may be formed of a stamping such as indicated at 25 in Fig. 5. The ends of the stamping, as shown in Fig. 5, are enlarged, and in the operation which shapes the arm into tubular form the enlarged ends are formed into annular cup-shaped eyes 26. Generally, the arms 14 of the lower parallelogram are of union size from end to end and the bearings at the opposite ends of these arms are of the same size, but generally the arms 13 of the upper parallelogram are made somewhat tapering and the bearings where the ends of the arms are connected to the anchor plate 12 are larger than the bearings at the joints 16, 19 and 20 in view of the overhanging load supported by the arms 13, since the weight of the parallelograms is off the board and is transmitted to the anchor plate 12 through the upper parallel rods 13. Accordingly, the stamping 25 is shown somewhat tapered and one end is somewhat larger than the other to accommodate the larger bearing.

It may be desirable to form the ends of the rods which receive the bearing separately from the body of the rod in which event the ends may be formed of stampings adapted to be secured to the body of the rod by welding, soldering or otherwise. In Fig. 9, I have shown the body 13a and rod end 13b formed of separate stampings which are connected together by a splicing insert to which the members of the two parts of the rod are shown secured by spot-welding. This method of forming the rods has the advantage that the ends can be held in a jig by means of the ball bearings when the ends are secured to the body of the rod, thus obtaining an exact distance between centers. The spot-welding method of forming the union at the splice is now preferred by me since the amount of heat transmitted to the rods is not sufficient to cause enough expansion to adversely effect the length of the rods or to injure the bearings.

In place of the four-point conical ball bearing shown in my prior patent referred to, the improved bearing for both parallelograms employed at the eight pivotal points referred to, is of the two-point or annular type, each consisting of an outer race 27 securely held in the eye 26, an inner race 28 and the intermediate balls 29 of which there may be any suitable number and which are preferably held in spaced relation by a suitable form of separator such as indicated at 30 (Fig. 3). The pivotal connections through the ball bearings, between the two pairs of rods 13 and 14 with the cross-members 12, 18 and 21 of the two parallelograms are made in an identical manner indicated in Figs. 6, 7 and 8. In Fig. 6, the rod 13 is shown connected to the anchor plate 12 and to the annulus 18. In Fig. 7 is shown the annulus 18 to which both pairs of rods are connected, and in Fig. 8 the part to which the rods may be connected may be any of the cross-members which, however, may be regarded as the annulus 18.

At each of the joints 15, 16, 19 and 20 the connection is made between the rod and the cross-member by a small bolt 31 extending through the cross-member and having a shank with a close fit in the inner race 28 of the bearing. The inner race is tightly clamped between a bushing or sleeve 32 and a nut 33, the parts thus clamped together being held against accidental loosening by a lock nut 34 or equivalent device.

To make this type of bearing suitable for drafting machines, it is essential that lost motion between the races and balls be eliminated without, however, disturbing the necessary freedom of motion between the connected parts. This I accomplish by causing the races and balls in the assembled joint to be constantly held or clamped in engagement regardless of the direction in which force and motion are transmitted through the joint, and I accomplish this preferably automatically by a slight spring action in the rods themselves, which spring action is obtained when the joint is tightened by screwing down the nut 33. This spring action and consequent clamping or tightening effect in the bearing just sufficient to eliminate the loose play without creating a binding action which might affect the accuracy of the machine is, in accordance with the preferred form of the invention, obtained in the process of forming the rods, in which process a slight distortion is imparted to the rods either in the nature of a slight bend, indicated in Fig. 6, or a slight twist, indicated in Fig. 7, or, if desired, by a combination of the two.

The initial distortion of the rods, which in no instance need be very great but simply commensurate in extent to the amount of lost motion in the bearings when formed, is in effect eliminated when the bearings are tightened, but in this straightening of the rods in tightening the joints, the rods have a permanent slight spring which keeps both races in contact with the balls without the slightest evidence of loose play as the protractor and rulers are moved in any direction over the drafting board. Notwithstanding the fact that to eliminate this lost motion, the inner and outer races are very slightly relatively tilted, there is nevertheless a fixed center of rotation about which the two races move relatively in the normal use of the machine as the draftsman moves it over the board.

It is to be noted that to make the bearing effective as an anti-friction joint free of excessive binding and without loose play or lost motion in its parts, it is only necessary to tighten down the nut 33 and it is important to note that no precise adjustment of the nut 33 is necessary. It need only be tightened and locked in place and not adjusted to a particular degree of tightness requiring skill on the part of the assembler, and there is no occasion for adjustment by the user. Furthermore, in tightening the joint while, theoretically, the axes of the inner and outer races are slightly relatively inclined, the two races remain concentric with respect to the center point of rotation and, therefore, no inaccuracy can result, as might be the case by lack of concentricity with the conical races of the bearings of the four-point type.

A further advantage in my improved bearing over the four-point bearing is the fact that the races engage the balls at their maximum diameter, giving the effect of considerably larger balls than with the former type of bearing. That is to say with my improved bearing I obtain the advantageous effect of larger balls and larger races without, however, any actual increase in size of either and without added weight, the latter being a feature of importance in drafting machines, as will be well understood.

While I prefer that the automatic take-up of lost motion be obtained by the spring action of the rods brought about by a slight distortion in the nature of a bend, twist or both, I do not desire to be confined to this precise way of obtaining these results, as it may be possible to obtain similar results by other means as, for example, by fitting the bearings into the ends of the rods so that initially the axis of the bearing is slightly displaced from a position at right angles to the plane of the rod the proper amount to obtain the desired results. Likewise, I do not desire to be confined to forming the rods from stampings, as herein illustrated, nor to the manner of securing the bearings in the ends of the rods, as features of this kind may be varied as found desirable or necessary to produce the best results.

I, therefore, aim in my claims to cover all modifications which do not involve a departure from the spirit and scope of the invention as defined in the appended claims.

Having thus described my invention, what I claim is:

1. In a drafting machine of the jointed arm type, the combination of a rod, a rod connecting element, and means for pivotally connecting said rod with said element including an annular ball bearing having races, said rod being flexed at assembly thereof with said connecting element whereby a flexure stress is created in the rod to urge relative tilting of the planes of said races to eliminate lost motion from said bearing.

2. In a drafting machine of the jointed arm type, the combination of a rod, a rod connecting element, and means for pivotally connecting said rod with said element including an annular ball bearing having a series of balls and a pair of races one of which races is held in slightly tilted relation to the other whereby lost motion in said bearing is eliminated.

3. In a drafting machine of the jointed arm type, the combination of parallel rods, and means interconnecting said rods at the ends thereof including a ball bearing for each rod end, each of said bearings having a series of balls and a pair of races cooperating therewith, one of said races being engaged by a rod and held by the latter with its axis slightly inclined relative to the axis of the other race whereby lost motion is eliminated.

4. In a drafting machine of the jointed arm type, the combination of parallel rods, means interconnecting said rods at the ends thereof, said means comprising a connector member, a ball bearing for each rod end, and means for securing the ball bearing to said connector member, each of said bearings having a series of balls and a pair of races cooperating therewith, one of said races being coaxial with, and secured to said connector member by, said securing means, and the other of said races being engaged by a rod and held by the latter with its axis slightly inclined to the axis of said securing means whereby lost motion is eliminated.

In testimony whereof, I hereunto affix my signature.

CHARLES H. LITTLE.